US008330418B2

(12) United States Patent
Furukawa

(10) Patent No.: US 8,330,418 B2
(45) Date of Patent: Dec. 11, 2012

(54) POWER SUPPLY DEVICE CAPABLE OF EQUALIZING ELECTRICAL PROPERTIES OF BATTERIES

(75) Inventor: Kimihiko Furukawa, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 140 days.

(21) Appl. No.: 13/071,859

(22) Filed: Mar. 25, 2011

(65) Prior Publication Data
US 2011/0234164 A1    Sep. 29, 2011

(30) Foreign Application Priority Data

Mar. 29, 2010 (JP) ................................ 2010-076127

(51) Int. Cl.
*H02J 7/00* (2006.01)
(52) U.S. Cl. ........................................................ 320/118
(58) Field of Classification Search .................. 320/118
See application file for complete search history.

(56) References Cited

U.S. PATENT DOCUMENTS

| | | | |
|---|---|---|---|
| 6,583,602 B2 | 6/2003 | Imai et al. | |
| 6,642,693 B2 * | 11/2003 | Anzawa et al. | 320/119 |
| 6,670,789 B2 * | 12/2003 | Anzawa et al. | 320/118 |
| 7,049,791 B2 * | 5/2006 | Lin et al. | 320/121 |
| 7,061,207 B2 * | 6/2006 | Patel et al. | 320/119 |
| 7,245,108 B2 * | 7/2007 | Chertok et al. | 320/132 |
| 7,880,433 B2 * | 2/2011 | Oh et al. | 320/118 |
| 7,939,965 B2 * | 5/2011 | Oh et al. | 307/43 |

FOREIGN PATENT DOCUMENTS

| | | |
|---|---|---|
| JP | 2003-333762 | 11/2003 |
| JP | 4029351 | 1/2008 |
| JP | 4244531 | 3/2009 |

* cited by examiner

*Primary Examiner* — Ramy Ramadan
(74) *Attorney, Agent, or Firm* — Wenderoth, Lind & Ponack, LLP

(57) ABSTRACT

A transformer 21 includes charging secondary winding lines 24 that can charge batteries 11 composing a corresponding cell block, and a discharging secondary winding line 26 that can discharge the corresponding cell block. Each of the charging secondary winding lines 24 is connected to corresponding one of the batteries 11 through corresponding one of secondary-side rectification output circuits 25 and corresponding one of output control switches 22. The discharging secondary winding line 26 is connected to a block discharging circuit through a block discharging switch 28. A switching control circuit 23 controls the block discharging switch 28. The switching control circuit 23 controls the output control switches 22 so that the electrical properties of the batteries 11 in the cell block are equalized. In addition, the switching control circuits 23 control the block discharging switches 28 so that the electrical properties of the batteries among the cell blocks are equalized.

5 Claims, 10 Drawing Sheets

POWER SUPPLY DEVICE CAPABLE OF EQUALIZING ELECTRICAL PROPERTIES OF BATTERIES

BACKGROUND OF THE INVENTION

1. Field of the Invention

The present invention relates to a power supply device that includes a number of batteries serially connected to each other for supplying high output voltage, and in particular to a power supply device for suitably driving vehicles.

2. Description of the Related Art

Vehicle power supply devices include a plurality of batteries that are serially connected to each other to increase the output voltage of the power supply devices. In such power supply devices, the serially-connected batteries are charged at the same amount of charging current, and are discharged at the same amount of current. For this reason, if all the batteries have the completely same properties, their battery voltages and remaining capacities will not be unbalanced. However, practically, batteries with completely the same properties cannot be manufactured. The unbalance among the batteries causes uneven voltages and remaining capacities after the batteries are repeatedly charged/discharged. In addition, if the batteries have unbalanced battery voltages, a particular battery may be over-charged or over-discharged. The over-charging/over-discharging operation may cause not only battery deterioration but also reduction in battery safety. A power supply device has been developed that, in order to prevent this problem, detects the voltages of batteries and eliminates the voltage difference among the batteries.

See Japanese Patent Publication No. 4029351, Japanese Patent Laid-Open Publication No. 2003-333762, and Japanese Patent Publication No. 4244531.

In the power supply device disclosed in Japanese Patent No. 4029351, a discharging circuit is connected in parallel to batteries that compose series battery groups. The discharging circuit discharges a battery the voltage of which is high to reduce the voltage of this batter. Thus, the unbalance among the batteries is eliminated so that the properties of the battery are equalized.

In the device that discharges the batteries so that the properties of the battery are equalized, a battery with high remaining capacity or voltage is discharged with reference to a battery with the lowest remaining capacity or voltage. Since the voltage of a battery with small remaining capacity is low, for example, the equalization circuit discharges batteries with higher voltage in order to equalize the voltages of the batteries so that the batteries with higher voltage are brought to the same voltage as the battery with low voltage. Accordingly, in the power supply device that includes a number of batteries serially connected to each other, if the remaining capacity of a particular battery becomes small and the voltage of the particular battery becomes low, the rest of batteries of the voltage of which is higher than this battery are required to be discharged to equalize the voltages of all of the batteries. In this case, since a number of batteries are discharged, the total discharged capacity of the rest of batteries to be discharged will be large. In addition, since a large number of, the rest of batteries to be discharged are reduced to the lowest voltage, the battery voltage unbalance tends to be large. As a result, the capacity to be discharged from batteries with higher voltage will be large. If the total discharged capacity is large, or if the discharged capacity of a particular battery is large, the amount of discharging heat generation will be large. The reason is that the amount of heat generation is proportional to the discharged capacity. In the power supply device disclosed in Japanese Patent No. 4029351, since a battery with high voltage is discharged via a discharging resistor, the amount of heat generation of this discharging resistor will be large. In particular, if the amount of heat generation of a number of discharging resistors is large, it is difficult to effectively dissipate heat generated by the discharging resistors mounted on a circuit board. In addition, since high power consumption discharging resistors have a large exterior shape, actually, it is difficult to mount a number of such discharging resistors on the circuit board. For this reason, actually, it is difficult to mount the large power consumption discharging resistors on the circuit board. Time required to discharge batteries to a lower voltage depends on the power consumption of the discharging resistor. The reason is that the discharging current relates to the power consumption of the discharging resistor. For this reason, it is difficult for a small discharging resistor to be mounted on the circuit board to quickly reduce the voltage of the battery. Accordingly, in this case, there is a disadvantage that it takes time to equalize the voltages of the batteries. That is, there is a trade-off relationship between time required to equalize the voltages of the batteries and the amount of heat generated by the discharging resistor. For this reason, both cannot be satisfied.

The present invention has been developed to solve the disadvantage in the power supply device that includes a number of batteries serially connected to each other. It is a main object of the present invention to provide a power supply device that can reduce total electric power in battery equalization but can quickly equalize the electrical properties of a number of batteries.

It is another main object of the present invention to provide a power supply device that reduces wasted power consumption in equalization among batteries for efficiently equalizing the electrical properties of the batteries.

SUMMARY OF THE INVENTION

To achieve the above object, a power supply device according to a first aspect of the present invention includes a series battery group 10 and cell block equalizing circuits 20. The series battery group 10 includes a plurality of rechargeable batteries 11 that are connected to each other in series. Each of the cell block equalizing circuits 20 discharges or charges batteries 11 composing the series battery group 10 so as to equalizes the electrical properties of the batteries 11. The series battery group 10 is divided into a plurality of cell blocks. The cell block equalizing circuits 20) serve as in-block equalization circuits each of which is connected to batteries 11) composing the corresponding cell block to equalize the electrical properties of the batteries 11) composing the corresponding cell block. The in-block equalization circuit includes a DC/DC converter, output control switches 22 and a switching control circuit 23. The DC/DC converter operates with being supplied with electric power from batteries 11 as power supply composing the corresponding cell block. Each of the output control switches 22 connects the output side of the DC/DC converter to the corresponding battery 11. The switching control circuit 23 controls ON/OFF of the output control switches 22. The DC/DC converter includes a transformer 21. The primary-side of the transformer 21 is connected through a primary-side switching element 41 to the series battery group 10 composed of the cell blocks. The transformer 21 includes charging secondary winding lines 24 and a discharging secondary winding line 26. The charging secondary winding lines can charge the batteries 11 composing the corresponding cell block. The discharging secondary winding line 26 can discharge the corresponding cell block. The charging secondary winding line 24 is connected to the corresponding battery 11 through a secondary-side rectification output circuit 25 and the corresponding output control switch 22. The discharging secondary winding line 26 is connected to a block discharging circuit through a block discharging switch 28. The block discharging switch 28 is controlled by the switching control circuit 23. The switching control circuit 23 controls the output control switches 22 of the corresponding cell block for equalizing the electrical properties of the batteries 11 composing the corresponding cell block. The switching control circuit 23 controls the block discharging switch 28 for equalizing the battery electrical properties of the cell blocks. According to this construction, it is possible to equalize not only the electrical properties of the batteries in the cell block but also the battery electrical properties of the cell blocks. Therefore, it is possible to keep the balance among the batteries of the entire power supply device. In particular, since a battery with small capacity is charged from other batteries, the amount of capacity to be discharged can be reduced, and additionally the rebalance can be acquired within a short time. In addition, since the amount of discharging current can be small, the amount of heat generation can be suppressed. Therefore, the circuitry of the power supply device can be small.

In a power supply device according to a second aspect of the present invention, the block discharging circuit is a block discharging resistor 29, or a power supply circuit 42 that rectifies the output from the discharging secondary winding line 26 and provides the rectified output. According to this construction, the electric power to be discharged for equalizing the battery electrical properties of the cell blocks is used for generating heat in a block discharging resistor or is used as a part of electric power to be consumed by the driving power supply circuit.

In a power supply device according to a third aspect of the present invention, the power supply circuit 42 is a circuit that supplies electric power to the switching control circuit 23 for driving the switching control circuit 23, or a circuit that charges an additional batteries. According to this construction, the electric power produced when batteries of the power supply device are discharged is used as electric power of the switching control circuit for driving the switching control circuit, or as electric power for charging an additional battery such as a battery for vehicle electrical components. Therefore, it is possible to effectively use energy that is produced when batteries of the power supply device are discharged.

In a power supply device according to a fourth aspect of the present invention, the switching control circuit 23, which controls the in-block equalization circuit for equalizing the electrical properties of the batteries 11 in the corresponding cell block, is supplied with driving electric power of the corresponding cell block to be equalized for driving the switching control circuit 23. According to this construction, the switching control circuit can be driven by the electric power of the corresponding cell block to be equalized. This construction is preferable from viewpoint of the balance of energy consumption.

A power supply device according to a fifth aspect of the present invention further includes a main CPU 30 that controls the switching control circuits 23. The main CPU 30 sends an equalization signal to the switching control circuits 23 so that the switching control circuits 23 control the batteries 11 so as to equalize the electrical properties of the batteries 11. In the case where the switching control circuit 23 is not provided with the equalization signal from the main CPU 30 within a predetermined period of time, the switching control circuits 23 holds the primary-side switching element 41 of the DC/DC converter in the OFF state. According to this construction, in the case where the equalization is unnecessary, the primary-side switching element is turned OFF so that the primary-side current does not flow. Therefore, power consumption can be reduced.

A vehicle according to a sixth aspect of the present invention includes the aforementioned power supply device.

The above and further objects of the present invention as well as the features thereof will become more apparent from the following detailed description to be made in conjunction with the accompanying drawings.

DETAILED DESCRIPTION OF THE EMBODIMENT(S

The following description will describe embodiments according to the present invention with reference to the drawings.

First Embodiment

Figure 1:
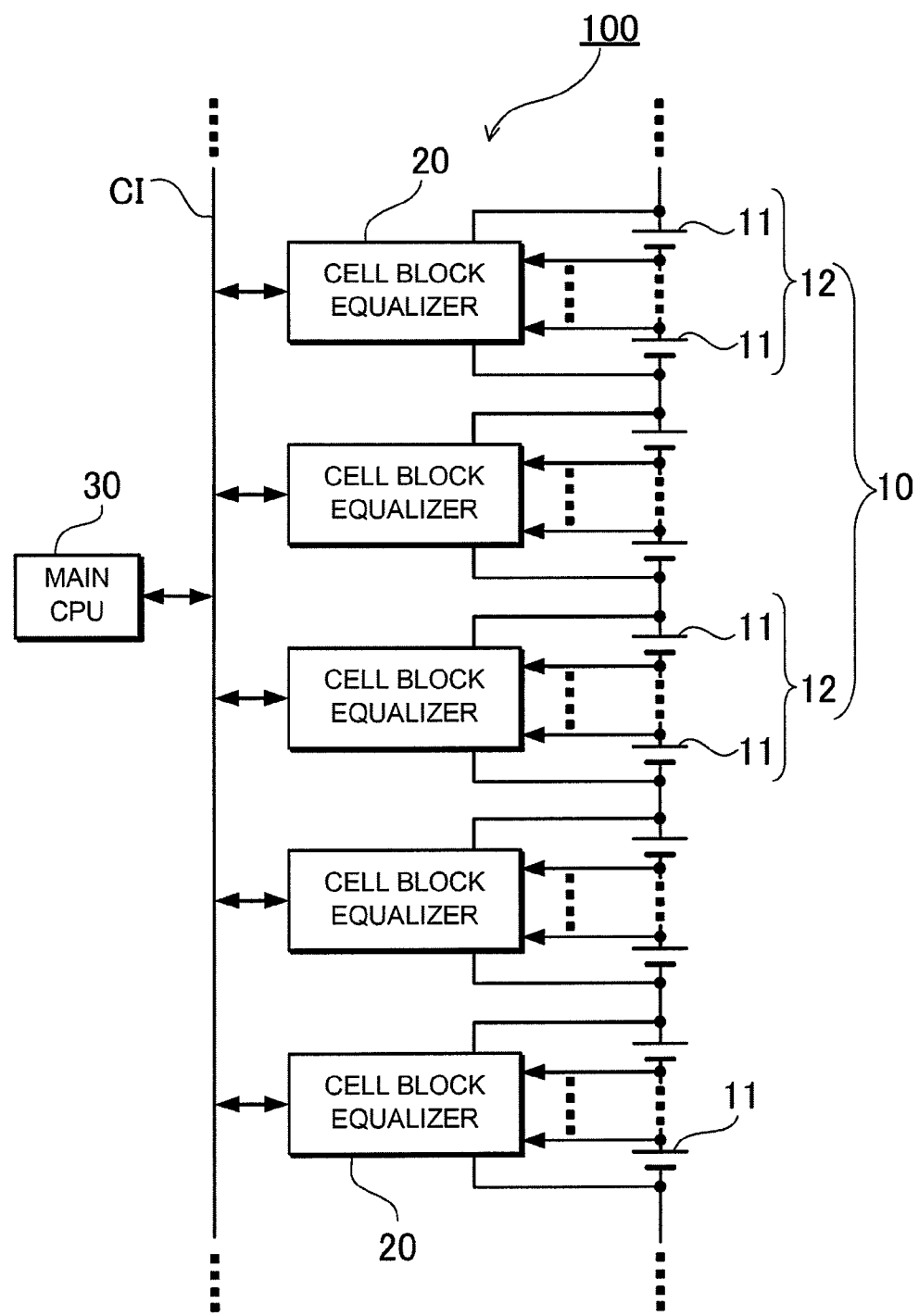
FIG. 1 is a block diagram showing the construction of a power supply device according to a first embodiment of the present invention.

FIG. 1 is a block diagram showing the construction of a power supply device 100 according to a first embodiment of the present invention. As shown in this block diagram, the power supply device 100 includes a series battery group 10 that includes a number of batteries 11 that are serially connected to each other. The series battery group 10 is divided into a plurality of blocks. Each of the blocks composes a cell block 12 that includes a predetermined number of batteries 11 that are serially connected to each other. Each of the cell blocks 12 is connected to corresponding one of cell block equalizing circuits 20 that suppresses the property variation among the batteries that are included in the cell block 12. A main CPU 30 controls the cell block equalizing circuits 20 for equalization where the property variation among the cell blocks is suppressed. The main CPU 30 is connected to and can communicate with the cell block equalizing circuits 20 through a communication interface CI.

(Cell Block Equalizing Circuit 20)

Figure 2:
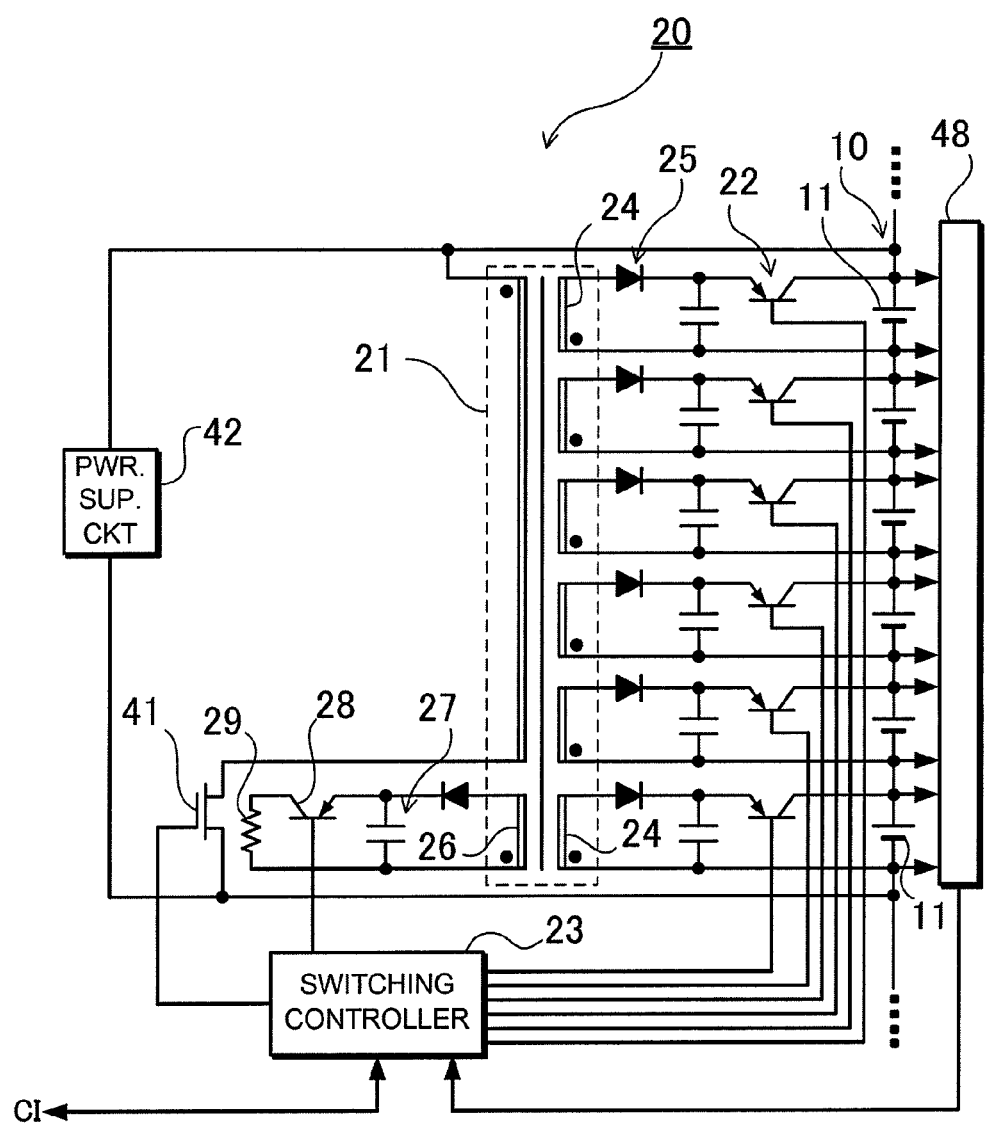
FIG. 2 is a circuit diagram showing an exemplary in-block equalization circuit in the power supply device shown in FIG. 1.

FIG. 2 shows exemplary circuitry of the cell block equalizing circuit 20. This illustrated cell block equalizing circuit 20 includes a transformer 21 that composes a DC/DC converter, output control switches 22 that are connected to the secondary side of the transformer 21, and a switching control circuit 23. A plurality of charging secondary winding lines 24 are provided on the secondary side of the transformer 21. Each of the charging secondary winding lines 24 is connected to corresponding one of the batteries 11 through corresponding one of secondary-side rectification output circuits 25 and corresponding one of the output control switches 22. In addition, a discharging secondary winding line 26 is connected to a second rectifying circuit 27, a block discharging switch 28, and a block discharging resistor 29 composing a block discharging circuit. Also, the primary-side of the transformer 21 is connected through a primary-side switching element 41 to a power supply circuit 42 and the series battery group 10 composed of the cell blocks.

(Battery 11)

The equalizing circuit 20 equalizes the electrical properties of the batteries 11 for eliminating the unbalance among the electrical properties of the batteries 11. An example of the electrical property can be provided by the remaining capacity of a battery (also referred to as SOC (State Of Charge), charged amount of a battery, the charged state value of a battery, or the like (hereinafter occasionally referred to as "SOC")). In the case where SOC is represented by battery voltage, the voltages of the batteries are equalized.

The batteries 11, which compose the series battery group 10, are lithium-ion rechargeable batteries. However, nickel metal hydride batteries or nickel-cadmium batteries can be used as the batteries. Ideally, the equalizing circuit 40 detects the voltage of each of the battery cells 11 as the cell voltage, and eliminates the unbalance among the cell voltages of the batteries 11. However, the power supply device according to this embodiment can include battery modules each of which is composed of a plurality of batteries serially connected to each other, and can detect the voltage of each battery module as the cell voltage for eliminating the unbalance among the voltages of the battery modules. In the power supply device that includes the batteries 11 of lithium-ion rechargeable batteries, it is preferable that the cell voltage be detected as the voltage of one battery. In the power supply device that includes batteries of nickel metal hydride batteries or nickel-cadmium batteries, this power supply device includes battery modules each of which is composed of a plurality of batteries serially connected to each other, and detects the voltage of each battery module as the cell voltage for eliminating the unbalance among the voltages of the battery modules, for example. In this specification, the battery can be composed of a single battery cell, or a plurality of battery cells that are connected to each other in series and/or in parallel.

The series battery group 10 is divided into a plurality of cell blocks. The cell block equalizing circuits 20 serve as in-block equalization circuits. Each of the cell block equalizing circuits 20 is connected to batteries composing the corresponding cell block to equalize the batteries 11 composing the corresponding cell block. In this power supply device 100, one primary-side switching circuit, a plurality of in-block equalization circuits, and one block discharging circuit are provided as the cell block equalizing circuit 20.

(Primary-Side Switching Circuit)

The primary-side switching element 41 is connected to the primary-side switching circuit. A semiconductor elements such as FET can be used as the primary-side switching element 41. The later-discussed switching control circuit 23 controls ON/OFF of the primary-side switching element 41. The duty ratio of the primary-side current is controlled by ON/OFF of the primary-side switching element 41 so that the secondary-side output current is adjusted.

(In-Block Equalization Circuit)

The in-block equalization circuit includes the DC/DC converter, the output control switches 22, and the switching control circuit 23. The DC/DC converter operates with being supplied with electric power from the batteries 11 as power supply composing the corresponding cell block. The output control switch 22 connects the output side of said DC/DC converter to the corresponding battery 11. The switching control circuit 23 controls ON/OFF of the output control switches 22.

(DC/DC Converter)

The DC/DC converter includes the transformer 21. Also, the primary-side of the transformer 21 is connected through the primary-side switching element 41 to the series battery group 10 composed of the cell blocks. That is, the primary-side electric power of the transformer 21 is supplied from the entire cell block through the primary-side switching element 41. The transformer 21 includes the charging secondary winding lines 24, and the discharging secondary winding line 26. Each of the charging secondary winding lines 24 can charge corresponding one of the batteries 11 composing the corresponding cell block. The discharging secondary winding line 26 can discharge the batteries composing the corresponding cell block. Each of the charging secondary winding lines 24 is connected to corresponding one of the batteries 11 through corresponding one of the secondary-side rectification output circuits 25 and corresponding one of the output control switches 22. The secondary side rectification output circuit 25 is composed of a rectifier diode and a smoothing capacitor. Also, the output control switch 22 is composed of a semiconductor switching element such as transistor.

The discharging secondary winding line 26 is connected to the block discharging circuit through the block discharging switch 28. The switching control circuit 23 controls ON/OFF of the block discharging switch 28.

(Block Discharging Circuit)

In the block discharging circuit, a second discharging path, the block discharging switch 28, and the block discharging resistor 29 are connected to each other. Similarly to the secondary-side rectification output circuit 25, the second rectifying circuit 27 is composed of a rectifier diode and a smoothing capacitor. The block discharging switch 28 is composed of a transistor. The block discharging resistor 29 is a resistor through which current flows when the block discharging switch 28 is brought in the ON state so that batteries are discharged through the resistor ("resistor discharging equalization"). Alternatively, instead of the block discharging resistor, a power supply circuit can be provided that rectifies the output of discharging secondary winding and provides the rectified output. In this case, electric power to be discharged for equalizing the battery electrical properties of the cell blocks can be used not for generating heat in a block discharging resistor but as a part of electric power to be consumed by the driving power supply circuit. Also, instead of the discharging resistor, an electric energy accumulator such as capacitor and additional battery can be provided that can be charged with the discharged current for accumulating the discharged electric energy.

According to this power supply device 100, the switching control circuit 23 controls the output control switches 22 so that the electrical properties of the batteries 11 in the cell block can be equalized. In addition, the switching control circuits 23 control the block discharging switches 28 so that the battery electrical properties of the cell blocks can be equalized. Since the equalization is thus performed in the two levels, the rebalance can be efficiently acquired even in the case a number of batteries are connected to each other in the power supply device. In addition, since a battery with small capacity is actively charged from other batteries in the equalization in the cell block (active equalization), the amount of the capacity to be discharged can be reduced so that the amount of heat generation can be suppressed. As a result, it is possible to suppress the amount of heat dissipation of a circuit board on which the equalizing circuit is mounted. Therefore, it is possible to reduce the circuitry of the power supply device in size. In addition, it is possible to reduce the time required for the equalization. According to the embodiment as shown in FIG. 2, since one block discharging circuit is provided, it is possible to simplify the circuitry of the power supply device. However, two or more block discharging circuits may be provided if necessary.

(Active Discharging Process)

Figure 3:
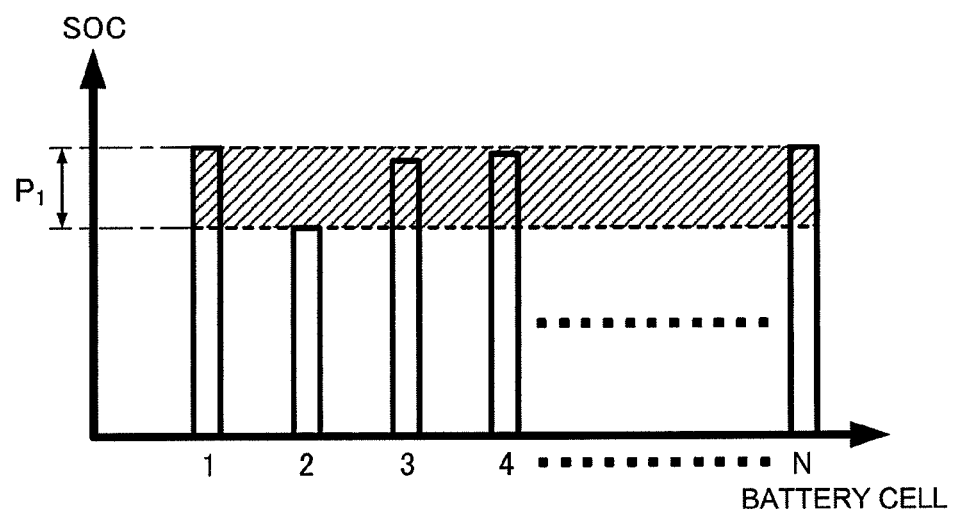
FIG. 3 is a graph showing elimination of SOC variation of batteries by conventional discharging equalization.
Figure 4:
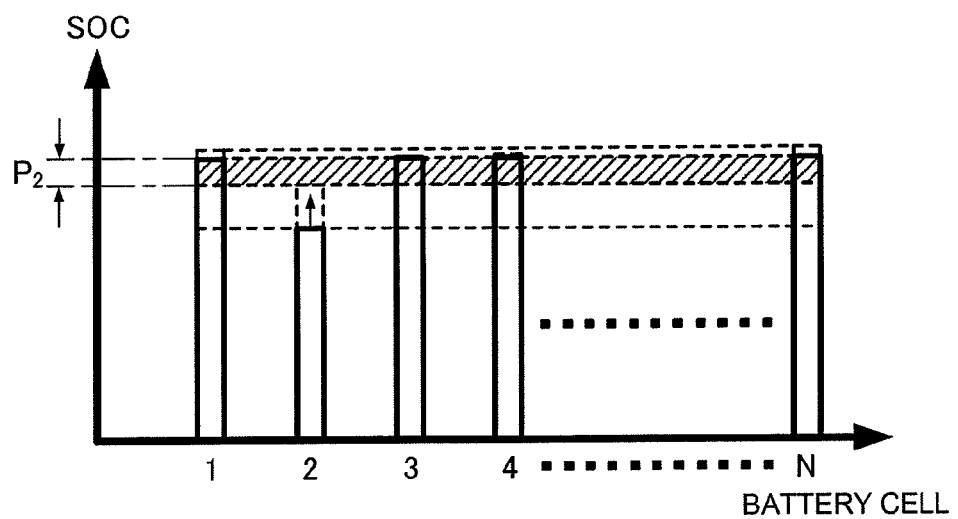
FIG. 4 is a graph showing elimination of SOC variation of batteries by active discharging equalization.

In the exemplary circuitry shown in FIG. 2, the resistor discharging process is not employed for the equalization in the cell block, but active discharging equalization is employed where a battery cell with low SOC is charged from battery cells with higher SOC. That is, in conventional equalization employing the resistor discharging process, to adjust the SOCs of battery cells to the lowest SOC of a battery cell among the batteries, the rest of battery cells are discharged. Accordingly, the discharging amount P1 will be large as shown by the shaded area in FIG. 3. As a result, the amount of heat generated by the discharging resistor will be also large. For this reason, there is a problem that the thermal capacity of the circuit board is required large on which the discharging resistor is mounted contrary to this, in the active equalization in-block equalization circuit where the properties of the batteries are equalized by charging/discharging electric charge by using the DC/DC converter, since, as shown in FIG. 4, a battery cell with the lowest SOC is charged from other battery cells, the lowest SOC can be increased while the highest SOC is reduced. As a result, as shown by the shaded area in FIG. 4, the discharging amount P2 can be smaller. In addition, the amount of heat generation can be also smaller. Correspondingly, the equalization current can be increased. As a result, there is an advantage that the properties of the batteries can be equalized within a short time.

However, in this case, the transformer will be essentially required to compose the DC/DC converter. In addition, if the number of battery cells composing the series battery group reaches about 30 to 80, since one output line to be paired of the transformer can be connected only to one cell, one transformer cannot transfer electric energy from some of a number of cells to another cells as long as the a large capacity transformer is used as the one transformer. For this reason, in this embodiment, the series battery group 10 is divided into the blocks so that the properties of the batteries are equalized block by block. As a result, the transformer can be prevented from having large capacity. The number of cells of the battery included in the one cell block can be about 4 to 10 cells, for example.

As discussed above, in the active equalizing circuit, since a battery cell with reduced SOC can be charged, as compared with a system employing only the resistor discharging equalization, the amount of discharged power from cells with higher SOC can be small. In the case of the resistor discharging equalization, even if the SOC of only one cell becomes lower, all the rest of cells are necessarily discharged so that their SOCs are reduced to the SOC of the one cell. Contrary to this, in the case of the active equalization, since a cell with lower SOC is charged, the difference between the adjusted SOC and the highest or lowest SOC can be small. For this reason, the amount to be discharged can be small. In this embodiment, a small power consumption resistor discharging circuit is employed in each of the blocks. The properties of the batteries are equalized in each of the blocks by the active equalizing circuit. On the other hand, the battery properties of the blocks are equalized by providing electric power from blocks with higher block voltage. According to this construction, the circuitry of the power supply device can be simplified, while the properties of the batteries can be efficiently equalized.

The in-block equalization circuit includes the switching circuit of the DC/DC converter, which discharges batteries from the both ends of the cell block. In the in-block equalization, a battery with lower SOC is charged, while an excess amount of electric power is discharged through the block discharging resistor 29 of the block discharging circuit. However, the in-block equalization circuit is not limited to this construction. For example, a discharging resistor or the like may be provided in one of the secondary side rectification output circuits so that the electric power is consumed for generating heat. Alternatively, a circuit for charging an additional battery may be provided in one of the secondary side rectification output circuit. In this case, the excess amount of electric power is consumed not only for generating heat but also for charging a 12-V lead battery for vehicle electrical components (later-discussed additional battery). Therefore, the discharged energy can be effectively used. Alternatively, the discharged electric power can be used as driving electric power of the switching control circuit 23.

In the exemplary circuitry shown in FIG. 2, the cell block equalizing circuit 20 operates with being supplied with electric power from the total voltage of the series battery group 10 composed of the cell blocks. Thus, all the electric power required for operation of the equalization in a cell block is supplied from the cells of this block. Therefore, the consumed electric power can be minimized. For example, electric power that is consumed in the equalization can be used for the equalization without consuming the electric power of the separately-connected, additional battery. Therefore, it is possible to efficiently use the batteries.

If the switching circuit constantly operates, the load of a power supply will increase as compared with the case where the equalizing circuit does not operate. For this reason, the output from the switching circuit is added for reducing the load of the power supply. Therefore, it is possible to suppress the power consumption in the equalizing circuit. Also, electric power can be supplied from one of the secondary side rectification output terminals of the DC/DC converter.

As for the control method of the DC/DC converter, the primary-side input electric power can also be increased by a factor of n in accordance with the number N of battery cells to be charged by the secondary side rectification output circuit. In this case, the range of n can be set within the range 1 (one) to about one-half of the number of the cells in the block. In the case where one cell block equalizing circuit is used in one block, as the number N of battery cells to be charged increases, the equalization time gets longer. The reason is that the battery cells to be charged are charged with 1/N of the output of the DC/DC converter. For this reason, the duty ratio of the block discharging switch of the primary-side switching circuit is controlled in accordance with the number of battery cells to be charged so that the input electric power is increased by a factor of N. Accordingly, the equalization can be performed in a short time by this control in accordance with the number of battery cells to be charged.

(Main CPU 30)

The switching control circuits 23 are controlled by the main CPU 30. The main CPU 30 sends an equalization signal to the switching control circuits 23 so that the switching control circuits 23 control the batteries 11 so as to equalize the electrical properties of the batteries 11.

Also, in order to perform the in-block equalization and block-to-block equalization, the main CPU 30 monitors the battery voltages of the batteries 11, and the block voltages of the cell blocks. For this reason, the batteries 11 are connected to sensor portions 48 such as voltage sensor and temperature sensor. The output signals are provided from the sensor portions 48 to the switching control circuits 23 or the main CPU 30. Alternatively, the in-block equalization can be performed not by the main CPU but by the corresponding switching control circuit 23 in the cell block. In this case, the output signals of the voltage sensors of the batteries 11 are sent to the switching control circuits 23 so that the in-block equalization in the corresponding block is performed by the switching control circuit 23. Even in this case, in order that the main CPU can grasp the in-block equalization in each of the cell blocks, it is preferable that the main CPU be provided with information relating to whether the in-block equalization is performed in each block, battery voltage, and the like.

In the embodiment shown in FIG. 2, the main CPU 30 performs the in-block equalization. Specifically, if the main CPU detects that the variation of the battery voltages of the batteries become larger than a predetermined battery voltage difference threshold value based on the voltages detected by the sensor portions 48 in a cell block, the main CPU provides the equalization signal to the switching control circuit 23 of the cell block so that the in-block equalization is performed in this cell block. That is, the output control switch 22 connected to a battery with the lowest battery voltage is turned ON so that this battery is charged. This battery is charged also by other batteries included in the corresponding cell block. Accordingly, the lowest battery voltage is increased, while the higher battery voltages are slightly reduced. As a result, the difference among the battery voltages can be reduced. When it is detected that the difference becomes smaller than the predetermined voltage difference threshold value based on the voltages detected by the sensor portions 48, the corresponding output control switch 22 is switched from ON to OFF so that the in-block equalization ends.

On the other hand, the main CPU 30 provides the equalization signal to the switching control circuits 23 based on the block voltages of the cell blocks so that the block-to-block equalization is performed. That is, if the lowest block voltage becomes lower than a predetermined block voltage threshold value, the block discharging switches of other cell blocks with higher block voltages are turned ON so that the block discharging circuit is driven. Thus, these other cell blocks with higher block voltages are discharged by resistor discharging process through the block discharging resistors so that the block voltages of these other cell blocks with higher block voltages are reduced. As a result, the difference among the block voltages can be reduced. When the main CPU detects that the block voltage difference is reduced to a value within a predetermined range by the block voltage reduction of the cell blocks with higher block voltages, the block discharging switches of the cell blocks with the higher block voltage is turned OFF so that the block-to-block equalization ends.

Second Embodiment

Figure 5:
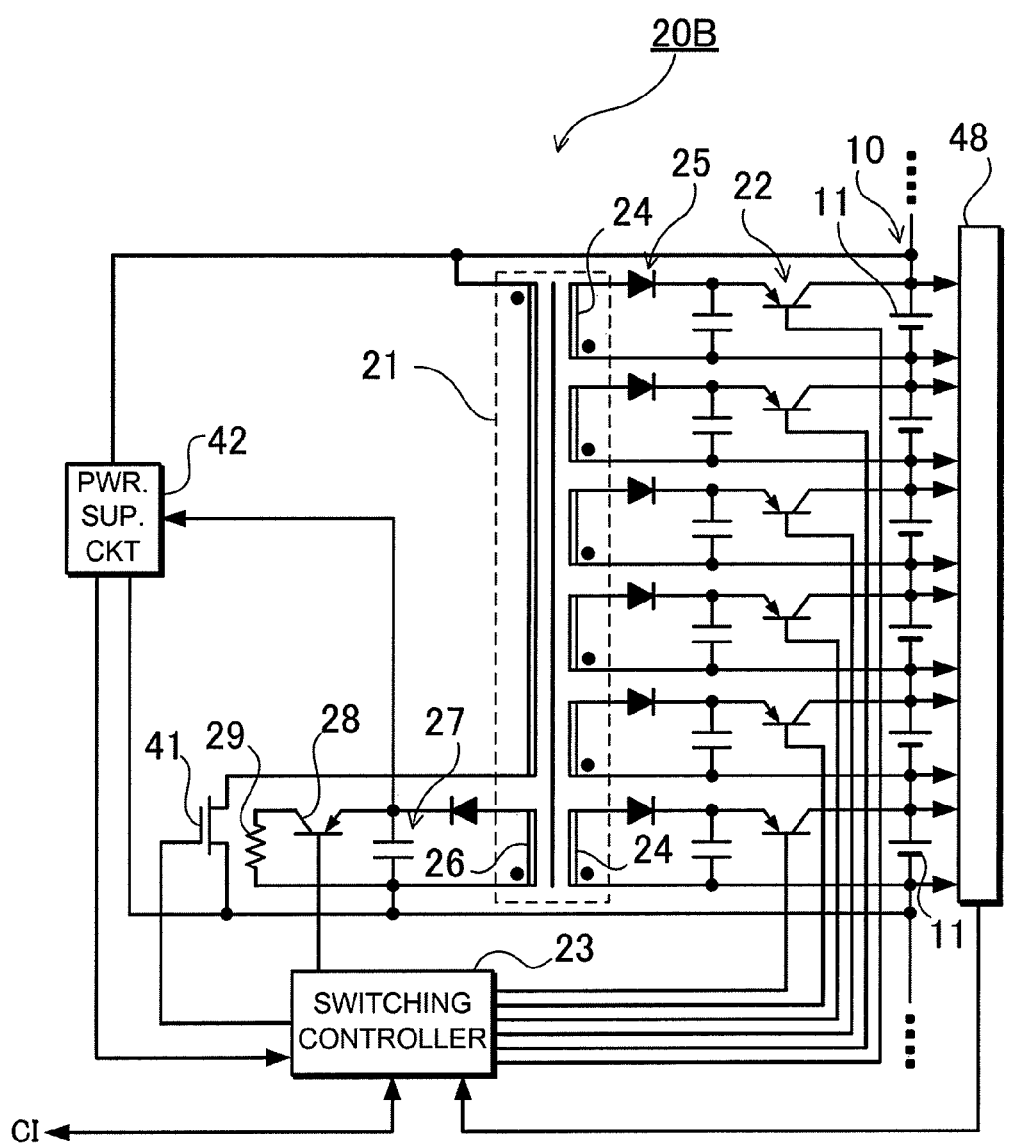
FIG. 5 is a block diagram showing the construction of a power supply device according to a second embodiment of the present invention.

The embodiment shown in FIG. 2 has been described in that the power supply circuit 42 reduces the block voltage, which is the total voltage of the series battery group 10, by using the DC/DC converter or the like, and supplies electric power for driving members such as the switching control circuits 23. However, in this construction, if the difference is large between the block voltage and electric power for driving a microcomputer that composes the member, the voltage conversion loss will be large. For this reason, it is preferable that voltage be provided from the discharging secondary winding line 26 as discussed above so that the voltage is used as the power supply voltage for driving the microcomputer. The reason is that electric power to be consumed in discharging equalization can be effectively used. FIG. 5 shows an exemplary diagram of this type of circuit according to a second embodiment. A cell block equalizing circuit 20B of this illustrated power supply device has substantially the same circuit construction as the circuit construction shown in FIG. 2 except that the high-voltage side of the smoothing capacitor of the second rectifying circuit 27 is provided to the power supply circuit 42. The voltage of the smoothing capacitor is converted (reduced, for example) in the power supply circuit 42, and is then provided to the switching control circuit 23. Thus, when the block discharging circuit operates, the switching control circuit 23 can be driven by this electric power. The electric power to be discharged can be efficiently used.

(Automatically Primary-Side Current Cutting Off Function)

On the other hand, although the primary-side current of the transformer composing the DC/DC converter may constantly flow, this results in loss if the current flows when the equalization is not performed. To avoid this loss, timer function can be provided that automatically stops oscillation of the primary side switching circuit if the equalization signal is not provided from the main CPU 30 within a predetermined period. Thus, the equalization can stop if not necessary. In this case, the power consumption can be reduced. For example, the switching control circuit 23 can have the timer function. If the equalization signal is not provided from the main CPU 30 to the switching control circuit 23 within the predetermined period, the switching control circuit 23 holds the primary-side switching element 41 OFF.

The main CPU 30 regularly measures the cell voltages, and determines based on the cell voltages whether the equalization is completed. If the equalization is completed, the main CPU 30 stops the equalization of the switching control circuit 23. However, if the additional battery is erroneously disconnected during the equalization in maintenance or the like, the equalization is continued in the case where the timer function is not provided. In this case, the cell SOCs in the series battery group may not be equalized but further deviate from the equalized electrical properties, or the SOCs may decrease, which in turn prevents the vehicle from starting. In the case where the timer function is provided which automatically stops equalization within a predetermined period, even if the additional battery is unintendedly disconnected, the equalization can stop so that such calculation deviation of SOCs can be avoided.

Third Embodiment

Additional Battery Charging Function

Figure 6:
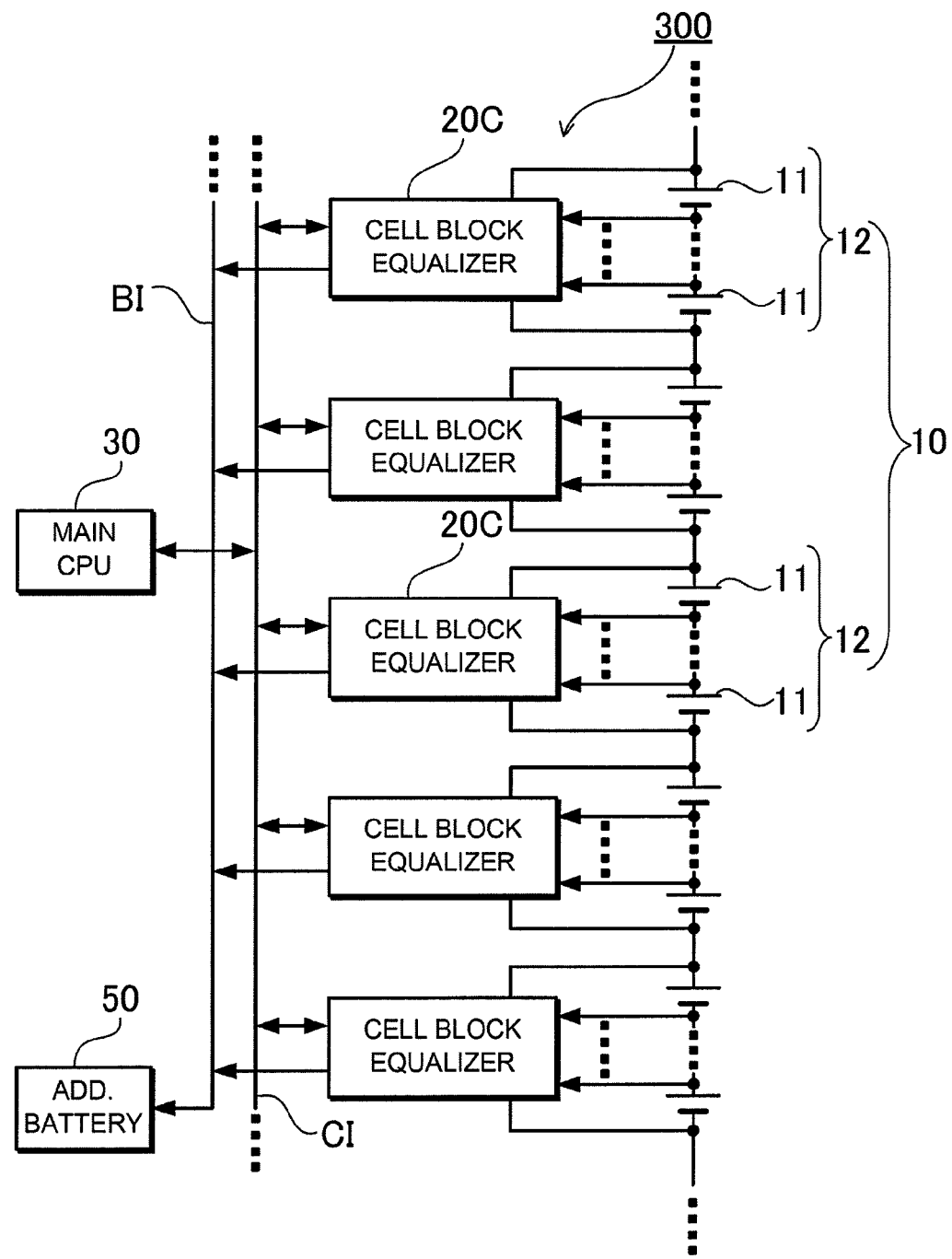
FIG. 6 is a block diagram showing the construction of a power supply device with an additional battery connected thereto according to a third embodiment of the present invention.
Figure 7:
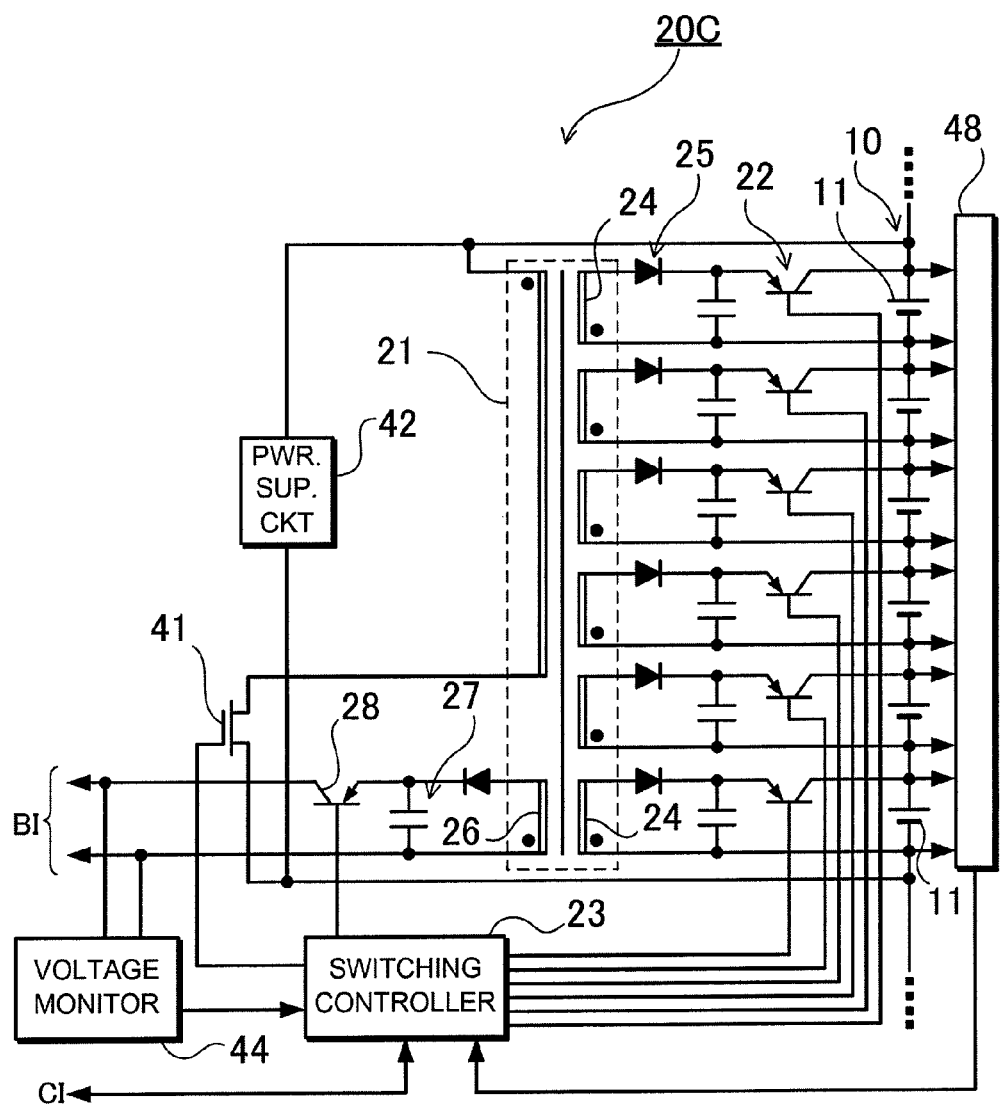
FIG. 7 is a circuit diagram showing an exemplary in-block equalization circuit in the power supply device shown in FIG. 6.

The electric power produced in the equalization can be used to charge the additional battery. FIGS. 6 and 7 show exemplary diagrams of this type of circuit according to a third embodiment. FIG. 6 is a block diagram of a power supply device 300 with an additional battery 50 connected to the power supply device 300. FIG. 7 shows an exemplary circuit of cell block equalizing circuit 20C shown in FIG. 6. In the case of vehicle use, for example, the illustrated additional battery 50 can be a 12-V lead battery for vehicle electrical components, while the series battery group 10 can be a battery for driving the vehicle. In the power supply device 300 shown in the block diagram of FIG. 6, in addition to the communication interface CI, which connects the cell block equalizing circuits to the main CPU 30 as shown in FIG. 1, an additional battery connecting interface BI is provided for charging the additional battery 50. Thus, the cell block equalizing circuits 20C and the additional battery 50 are connected to each other via the additional battery connecting interface BI. Also, the transformer 21 is used similarly to the embodiment shown in FIG. 2. The additional battery 50 is connected to the primary side of the transformer 21, while the series battery group 10 is connected to the secondary side of the transformer 21. Thus, the series battery group 10 and the additional battery 50 can be electrically insulated from each other. Therefore, the safety of the power supply device can be improved.

(Voltage Monitoring Circuit 44)

As shown in the exemplary circuit of the cell block equalizing circuit 20C of FIG. 7, a voltage monitoring circuit 44 for detecting discharge voltage is connected instead of the block discharging resistor shown in FIG. 2, and the block discharging switch 28 of the block discharging circuit is serially connected to the additional battery connecting interface BI. Accordingly, the electric power in the block-to-block equalization can be efficiently used to charge the additional battery 50.

In this construction, if the additional battery 50 is unintendedly disconnected, or if poor contact occurs, the discharging process is not performed so that there is a possibility that power supply voltage may rise. For this reason, the voltage is monitored by the voltage monitoring circuit 44. If the voltage exceeds a predetermined discharging process stop voltage threshold value, it is determined that abnormality occurs, and the block discharging circuit stops the discharging process. Accordingly, even if the additional battery is unintendedly disconnected, the safety of the power supply device can be improved.

(Block Discharge Control Circuit 46)

Figure 8:
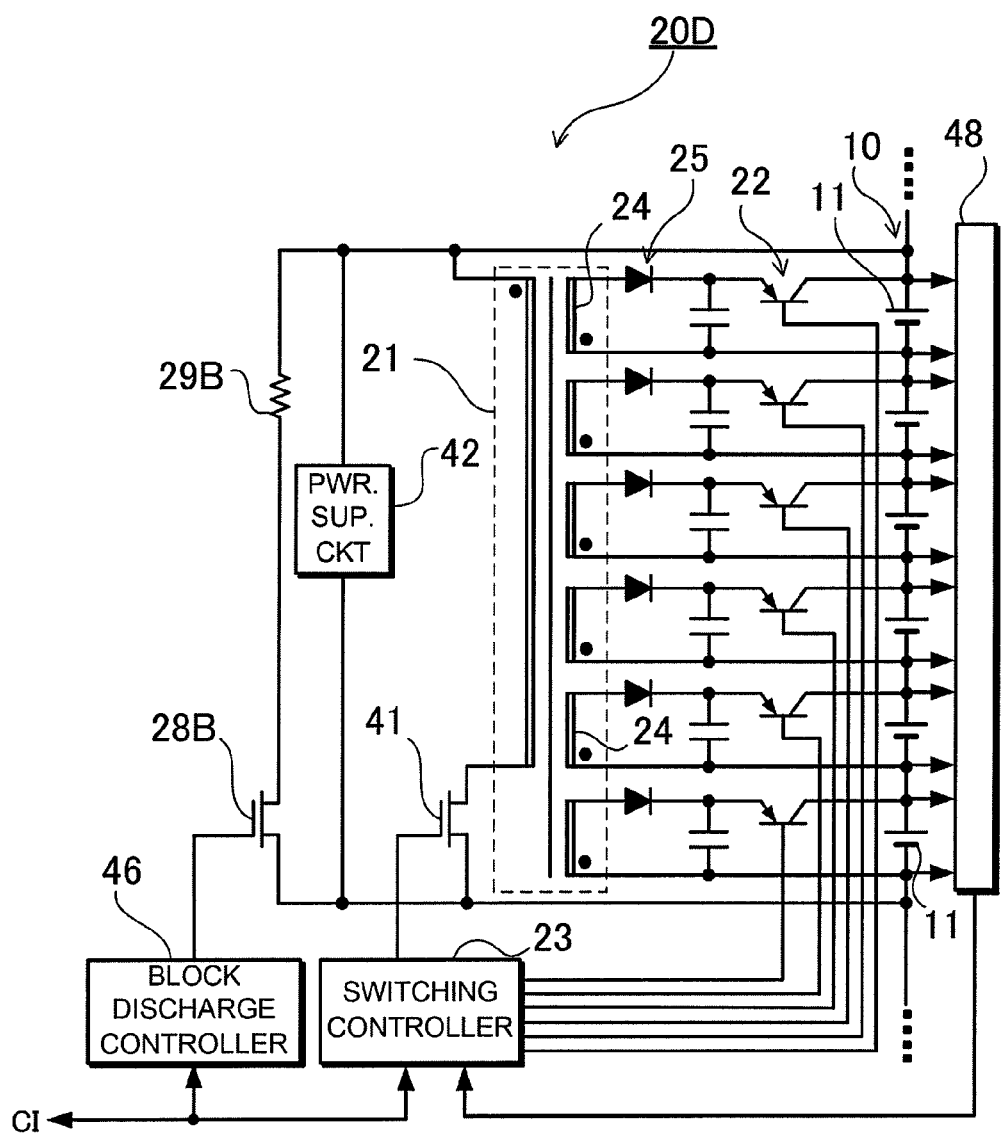
FIG. 8 is a block diagram showing the construction of a power supply device according to a fourth embodiment of the present invention.

The aforementioned power supply devices have been described in that the switching control circuit 23 receives the equalization signal from the main CPU and performs the in-block equalization and the block-to-block equalization. However, the present invention is not limited to this construction. Separated members can be provided for separately performing the in-block equalization and the block-to-block equalization. For example, in a fourth embodiment shown in FIG. 8, the switching control circuit 23 composing the cell block equalizing circuit 20D controls the in-block equalization circuit so that the in-block equalization is performed, while a block discharge control circuit 46 controls the block discharging circuit so that the block-to-block equalization is performed. In this example, in order to perform the block-to-block equalization, a block discharging resistor 29B is connected to the entire cell block via a block discharging switch 28B. When the main CPU detects that a cell block has block voltage difference between this cell block and other cell blocks higher than a predetermined block-to-block equalization threshold value, the corresponding block discharging switch 28B of this cell block is turned ON by the main CPU. After that, when the block voltage difference between this cell block and other cell blocks becomes lower than the predetermined block-to-block equalization threshold value, the corresponding block discharging switch 28B of this cell block is turned OFF by the main CPU so that block-to-block equalization ends.

The power supply devices can be used as a battery system for vehicles. The power supply device can be installed on electric vehicles such as hybrid cars that are driven by both an engine and a motor, and electric vehicles that are driven only by a motor. The power supply device can be used as a power supply device for these types of vehicles.

Figure 9:
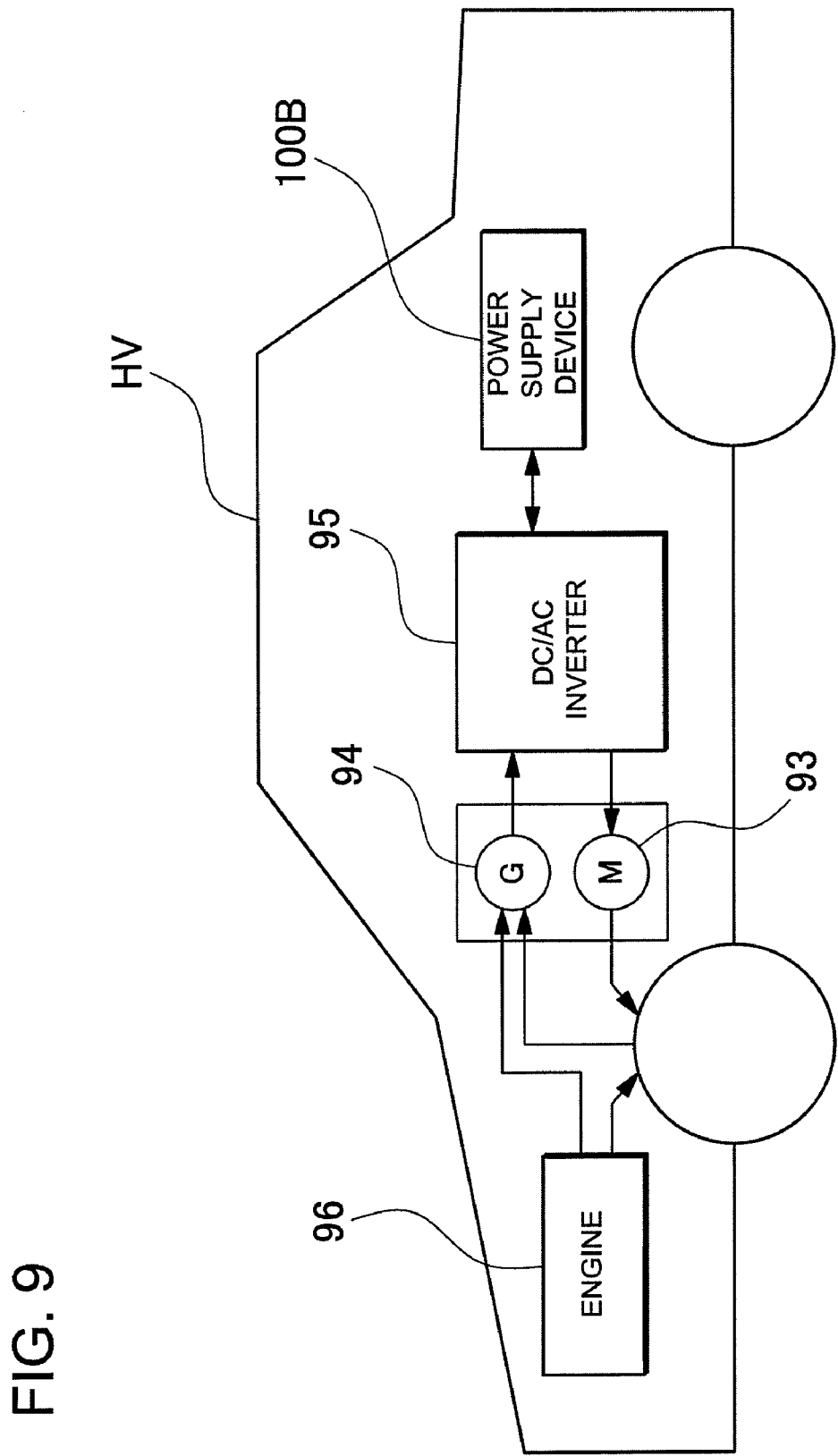
FIG. 9 is a block diagram showing an exemplary hybrid car that is driven by an engine and an electric motor, and includes the power supply device.

FIG. 9 is a block diagram showing an exemplary hybrid car that is driven both by an engine and an electric motor, and includes the power supply device. The illustrated vehicle HV with the power supply device includes an electric motor 93 and an engine 96 that drive the vehicle HV, a power supply device 100B that supplies electric power to the electric motor 93, and an electric generator 94 that charges batteries of the power supply device 100B. The power supply device 100B is connected to the electric motor 93 and the electric generator 94 via a DC/AC inverter 95. The vehicle HV is driven both by the electric motor 93 and the engine 96 with the batteries of the power supply device 100B being charged/discharged. The electric motor 93 is energized with electric power and drives the vehicle in a poor engine efficiency range, e.g., in acceleration or in a low speed range. The electric motor 93 is energized by electric power is supplied from the power supply device 100B. The electric generator 94 is driven by the engine 96 or by regenerative braking when users brake the vehicle so that the batteries of the power supply device 100B are charged.

Figure 10:
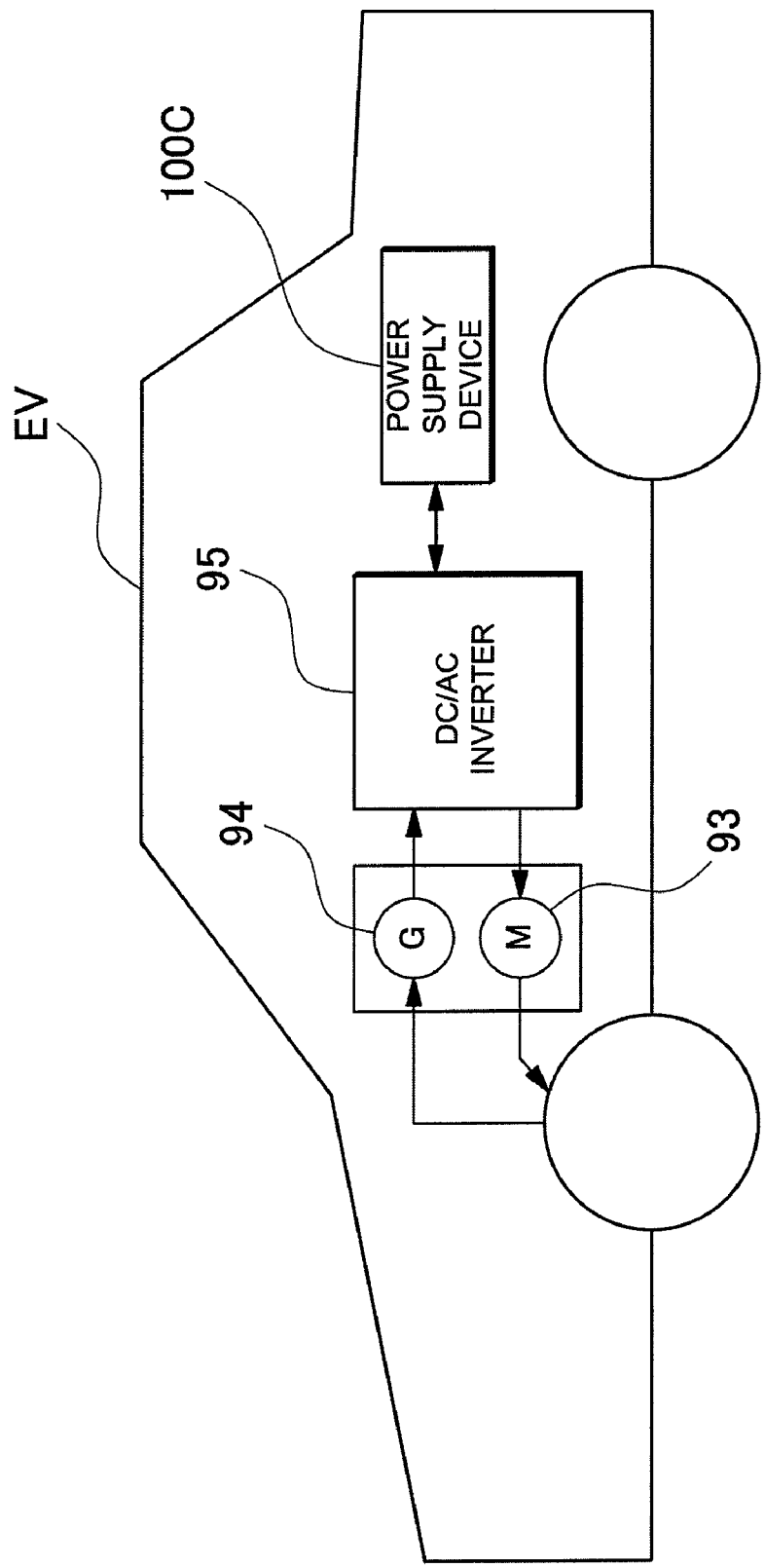
FIG. 10 is a block diagram showing an exemplary electric vehicle that is driven only by an electric motor, and includes the power supply device.

FIG. 10 shows an exemplary electric vehicle that is driven only by an electric motor, and includes the power supply device. The illustrated vehicle EV with the power supply device includes an electric motor 93 that drives the vehicle EV, a power supply device 100C that supplies electric power to the electric motor 93, and an electric generator 94 that charges batteries of the power supply device 100C. The electric motor 93 is energized by electric power that is supplied from the power supply device 100C. The electric generator 94 can be driven by vehicle EV regenerative braking so that the batteries of the power supply device 100C are charged.

(Power Storage Type Power Supply Device)

Figure 11:
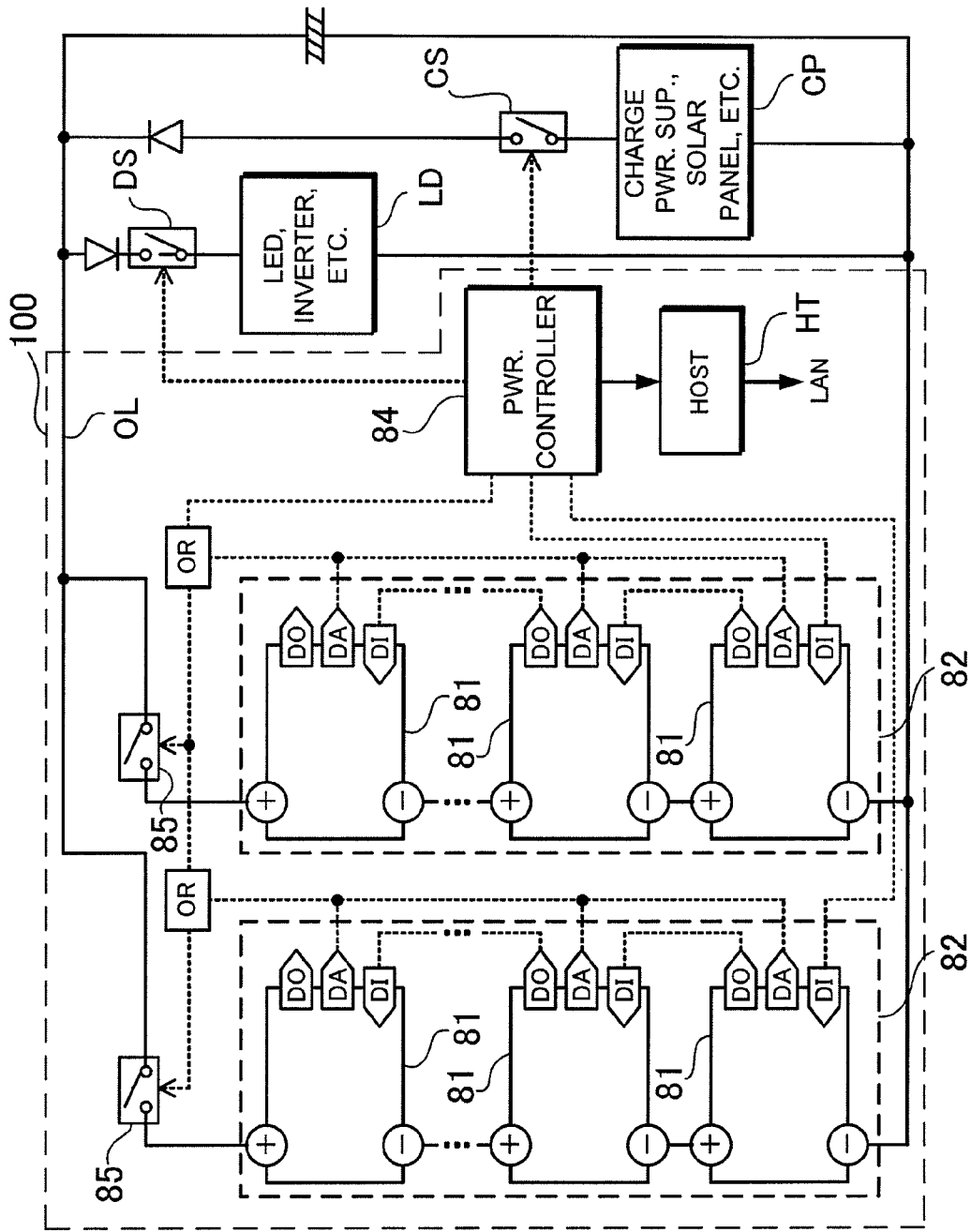
FIG. 11 is a block diagram a power storage type power supply device to which the present invention is applied.

The power supply device can be used not only as power supply of mobile unit such as vehicle but also as stationary power storage. For example, examples of stationary power storage devices can be provided by an electric power system for home use or plant use that is charged with solar electric power or with midnight electric power and is discharged when necessary, a power supply for street lights that is charged with solar electric power during the daytime and is discharged during the nighttime, or a backup power supply for signal lights that drives signal lights in the event of a power failure. FIG. 11 shows a circuit diagram according to this embodiment. This illustrated power supply device 100 includes battery units 82 each of which includes a plurality of battery packs 81 that are connected to each other. In each of battery packs 81, a plurality of battery cells are connected to each other in serial and/or in parallel. The battery packs 81 are controlled by a power supply controller 84. In this power supply device 100, after the battery units 82 are charged by a charging power supply CP, the power supply device 100 drives a load LD. The power supply device 100 has a charging mode and a discharging mode. The Load LD and the charging power supply CP are connected to the power supply device 100 through a discharging switch DS and a charging switch CS, respectively. The discharging switch DS and the charging operation switch CS are turned ON/OFF by the power supply controller 84 of the power supply device 100. In the charging mode, the power supply controller 84 turns charging operation switch CS ON, and turns the discharging switch DS OFF so that the power supply device 100 can be charged by the charging power supply CP. When the charging operation is completed so that the battery units are fully charged or when the battery units are charged to a capacity not lower than a predetermined value, if the load LD requests electric power, the power supply controller 84 turns the charging operation switch CS OFF, and turns the discharging switch DS ON. Thus, operation is switched from the charging mode to the discharging mode so that the power supply device 100 can be discharged to supply power to the load LD. In addition, if necessary, the charging operation switch CS may be turned ON, while the discharging switch DS may be turned ON so that the load LD can be supplied with electric power while the power supply device 100 can be charged.

The load LD driven by the power supply device 100 is connected to the power supply device 100 through the discharging switch DS. In the discharging mode of the power supply device 100, the power supply controller 84 turns the discharging switch DS ON so that the power supply device 100 is connected to the load LD. Thus, the load LD is driven with electric power from the power supply device 100. Switching elements such as FET can be used as the discharging switch DS. The discharging switch DS is turned ON/OFF by the power supply controller 84 of the power supply device 100. The power supply controller 84 includes a communication interface for communicating with an external device. In the power supply device according to the embodiment shown in FIG. 11, the power supply controller is connected to a host device HT based on existing communications protocols such as UART and RS-232C. Also, the power supply device may include a user interface that allows users to operate the electric power system if necessary. Each of the battery packs 81 includes signal terminals and power supply terminals. The signal terminals include a pack input/output terminal DI, a pack abnormality output terminal DA, and a pack connection terminal DO. The pack input/output terminal DI serves as a terminal for providing/receiving signals to/from other battery packs and the power supply controller 84. The pack connection terminal DO serves as a terminal for providing/receiving signals to/from other battery packs as slave packs. The pack abnormality output terminal DA serves as a terminal for providing an abnormality signal of the battery pack to the outside. Also, the power supply terminal is a terminal for connecting one of the battery packs 81 to another battery pack in series or in parallel. In addition, the battery units 82 are connected to an output line OL through parallel connection switched 85, and are connected in parallel to each other.

INDUSTRIAL APPLICABILITY

A power supply device according to the present invention can be suitably applied to power supple devices of plug-in hybrid vehicles and hybrid electric vehicles that can switch between the EV drive mode and the HEV drive mode, electric vehicles, and the like. The power supply device according to the present invention is not limited to power supple devices for vehicles. For example, the power supply device according to the present invention can be also used as batteries for power assisted electric bicycles, electric motorbikes, and power tools.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2010-076127 filed in Japan on Mar. 29, 2010, the content of which is incorporated herein by reference.

What is claimed is:

1. A power supply device comprising:
    a series battery group that includes a plurality of rechargeable batteries that are connected to each other in series; and
    cell block equalizing circuits each of which discharges or charges batteries composing said series battery group so as to equalizes the electrical properties of the batteries, wherein
    said series battery group is divided into a plurality of cell blocks, wherein said cell block equalizing circuits serve as in-block equalization circuits each of which is connected to batteries composing the corresponding cell block to equalize the electrical properties of the batteries composing the corresponding cell block, wherein
    said in-block equalization circuit includes
        a DC/DC converter that operates with being supplied with electric power from batteries as power supply composing the corresponding cell block,
        output control switches each of which connects the output side of said DC/DC converter to the corresponding battery, and
        a switching control circuit that controls ON/OFF of said output control switch, wherein
    said DC/DC converter includes a transformer the primary-side of which is connected through a primary-side switching element to the series battery group composed of the cell blocks, wherein
    said transformer includes
        charging secondary winding lines that can charge the batteries composing said corresponding cell block, and
        a discharging secondary winding line that can discharge said corresponding cell block, wherein
    said charging secondary winding line is connected to the corresponding battery through a secondary-side rectification output circuit and the corresponding control switch, and said discharging secondary winding line is connected to a block discharging circuit through a block discharging switch, wherein
    said block discharging switch is controlled by said switching control circuit, wherein
    said switching control circuit controls said output control switches of the corresponding cell block for equalizing the electrical properties of the batteries composing the corresponding cell block, and wherein
    said switching control circuit controls said block discharging switch for equalizing the battery electrical properties of the cell blocks.

2. The power supply device according to claim 1, wherein said block discharging circuit is a block discharging resistor, or a power supply circuit that rectifies the output from the discharging secondary winding lines and provides the rectified output.

3. The power supply device according to claim 2, wherein said power supply circuit is a circuit that supplies electric power to said switching control circuit for driving said switching control circuit, or a circuit that charges an additional battery.

4. The power supply device according to claim 1, wherein said switching control circuit, which controls said in-block equalization circuit for equalizing the electrical properties of the batteries in the corresponding cell block, is supplied with electric power of the corresponding cell block to be equalized for driving switching control circuit.

5. The power supply device according to claim 1 further comprising a main CPU that controls said switching control circuits, wherein said main CPU sends an equalization signal to said switching control circuits so that said switching control circuits control the batteries so as to equalize the electrical properties of the batteries, and wherein in the case where said switching control circuit is not provided with the equalization signal from said main CPU within a predetermined period of time, said switching control circuits holds the primary-side switching element of said DC/DC converter in the OFF state.

* * * * *